United States Patent
Leyre et al.

(10) Patent No.: US 7,464,902 B2
(45) Date of Patent: Dec. 16, 2008

(54) SATELLITE WITH ELECTROMAGNETIC CONTROL OF OBJECTS

(75) Inventors: Xavier Leyre, Opio (FR); Hervé Sainct, Le Cannet (FR)

(73) Assignee: THALES, Neuilly sur Seine (FR)

( * ) Notice: Subject to any disclaimer, the term of this patent is extended or adjusted under 35 U.S.C. 154(b) by 109 days.

(21) Appl. No.: 11/095,504

(22) Filed: Apr. 1, 2005

(65) Prior Publication Data

US 2005/0248491 A1 Nov. 10, 2005

(30) Foreign Application Priority Data

Apr. 2, 2004 (FR) .................................. 04 50663

(51) Int. Cl.
*B64G 1/66* (2006.01)
(52) U.S. Cl. .................................... 244/173.3; 244/166
(58) Field of Classification Search ............. 244/172.5, 244/172.4, 173.3, 158.6, 158.4, 166, 171; 455/13.1, 13.4, 12.1

See application file for complete search history.

(56) References Cited

U.S. PATENT DOCUMENTS

| 4,489,383 | A | * | 12/1984 | Schmidt, Jr. .................. 701/13 |
| 5,377,936 | A | * | 1/1995 | Mitchell ..................... 244/167 |
| 6,089,510 | A | * | 7/2000 | Villani et al. ............... 244/166 |
| 6,193,194 | B1 | * | 2/2001 | Minovitch ............... 244/171.3 |
| 6,356,814 | B1 | * | 3/2002 | Koenigsmann ............... 701/13 |
| 6,454,215 | B1 | * | 9/2002 | Pedreiro .................. 244/173.1 |
| 6,634,603 | B2 | * | 10/2003 | Cooper ...................... 244/166 |
| 2006/0091262 | A1 | * | 5/2006 | Belisle ....................... 244/166 |

FOREIGN PATENT DOCUMENTS

FR 2 793 569 A1 11/2000

* cited by examiner

*Primary Examiner*—Timothy D Collins
(74) *Attorney, Agent, or Firm*—Sughrue Mion, PLLC

(57) ABSTRACT

A satellite comprises a main body and, in orbit, at least one free object floating in space including a portion of the payload transferred from the main body. The free object is restricted to a precise position and attitude relative to the main body. An electromagnetic force and an electromagnetic torque are produced for controlling the position and the attitude of the free object in accordance with a master-slave relationship.

11 Claims, 2 Drawing Sheets

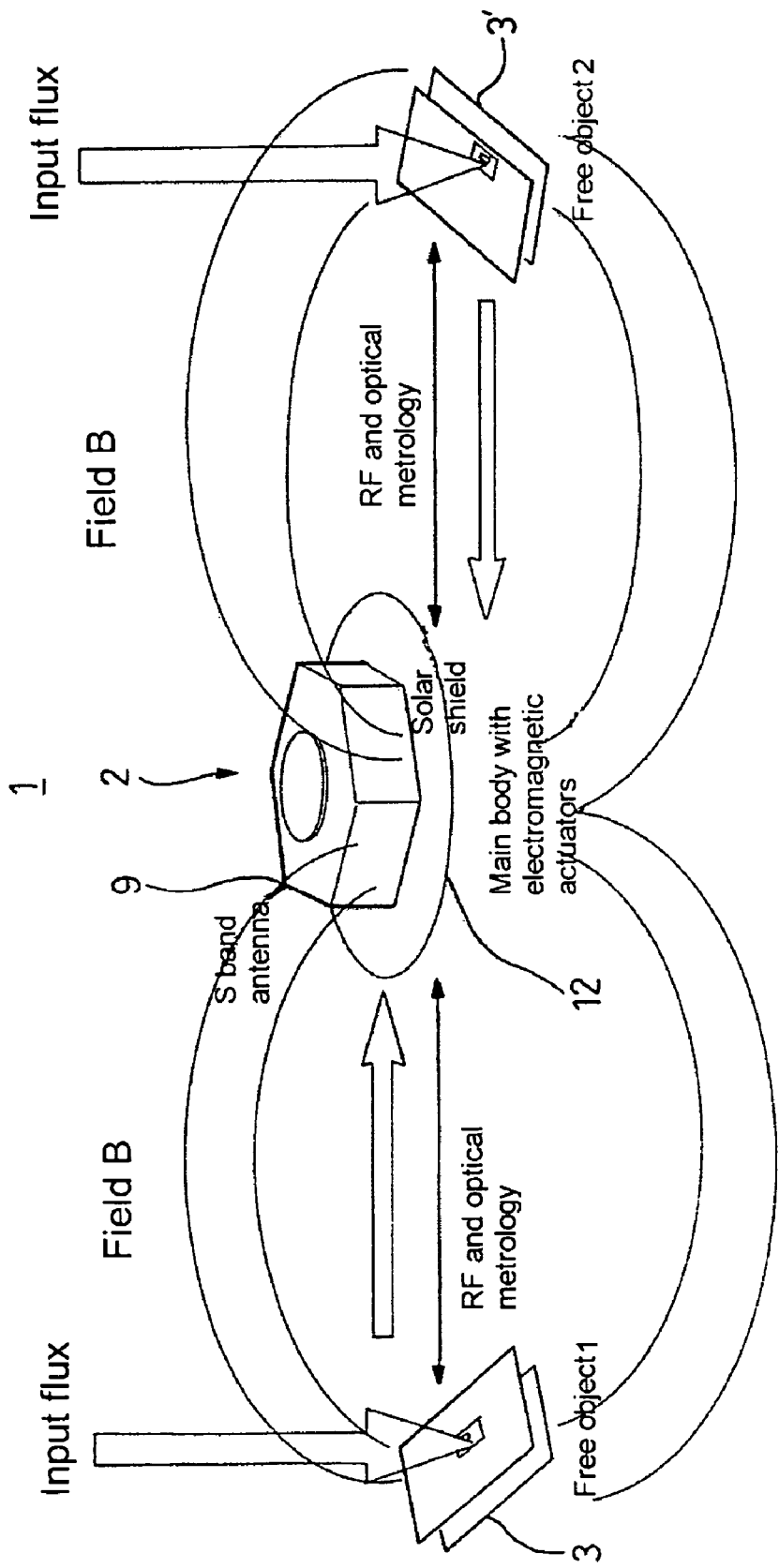

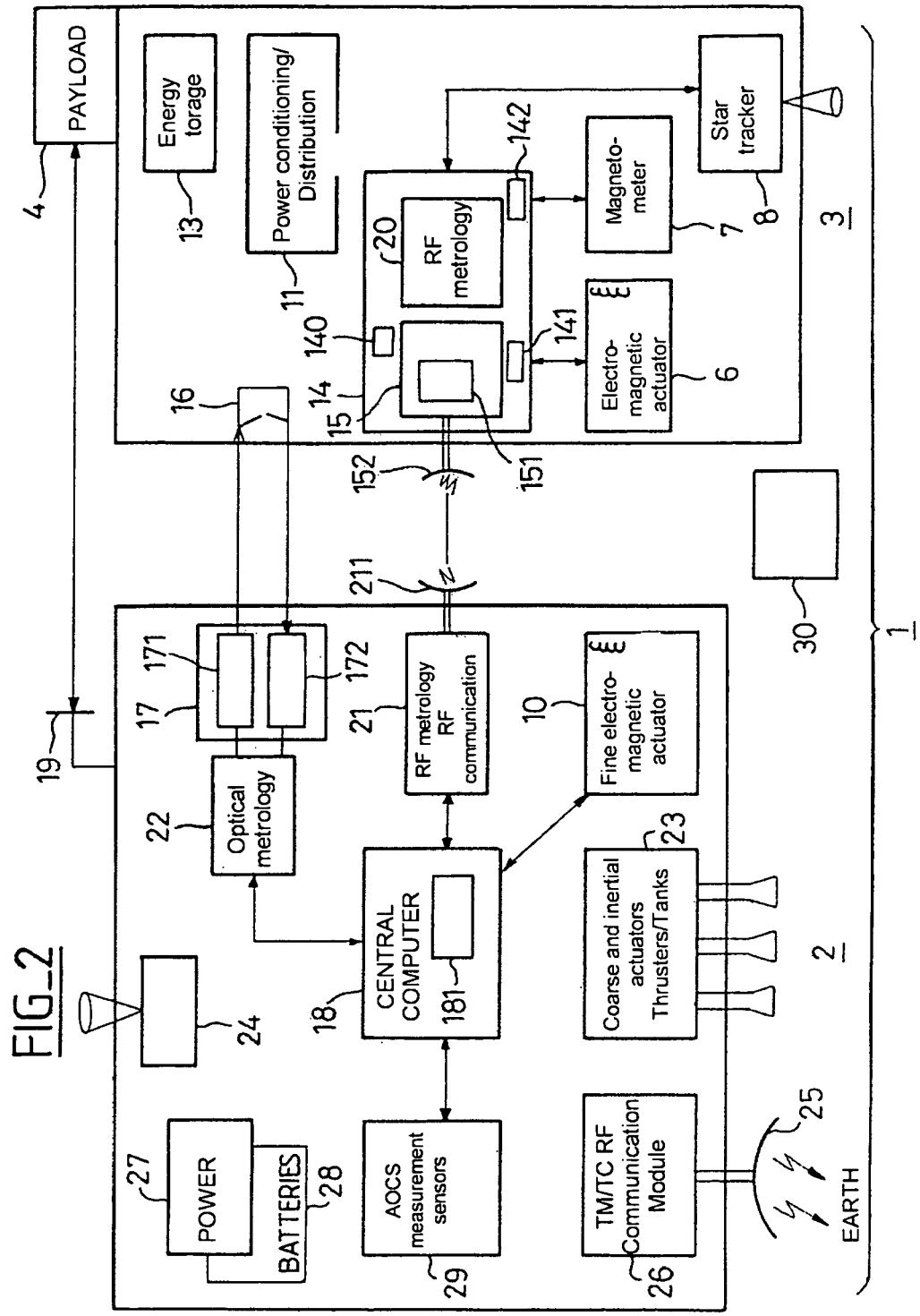

SATELLITE WITH ELECTROMAGNETIC CONTROL OF OBJECTS

CROSS-REFERENCE TO RELATED APPLICATIONS

This application is based on French Patent Application No. 04 50 663 filed Apr. 2, 2004, the disclosure of which is hereby incorporated by reference thereto in its entirety, and the priority of which is hereby claimed under 35 U.S.C. § 119.

BACKGROUND OF THE INVENTION

1. Field of the Invention

The present invention concerns the spatial domain and, more particularly, a satellite adapted in flight to control objects floating in space using electromagnetic forces and electromagnetic torques.

2. Description of the Prior Art

Satellites flying in formation to detect extrasolar planets are known in the art. These formation flights necessitate a plurality of satellites (typically six satellites) with extremely tight relative positioning requirements. Other types of constellations are envisaged in the astronomy field, for synthetic aperture imaging by simulating a mirror whose maximum dimensions correspond to the maximum distance between two satellites (typically of the order of several hundred meters). These dimensions are obviously not compatible with the diameters available under the nose-cap of current launch vehicles (typically a few meters) and therefore make a major technological leap. The orbit for this type of application is generally chosen from the Lagrange points (typically L2) for the extremely stable character of the conditions (thermal, gravitational, radiation) that reign therein, allowing the installation of very sensitive and cooled payloads. In terms of formation flying performance, this implies micrometric or even nanometric accuracy and stability over relatively long periods of time (possibly up to a few days).

To satisfy these requirements, the constellation must comprise a certain number of satellites, very accurate metrology subsystems and extremely accurate and very low noise propulsion subsystems.

The concepts classically adopted to satisfy this type of requirement are based on n identical and autonomous satellites whose propulsion is based on a system of thrusters distributed over the whole constellation. The type of thruster used ranges from the standard chemical type to ionic thrusters and field electrical effect propulsion (FEEP) thrusters, this latter technique using the application of high voltages to molecules of cesium or indium to generate a very high speed for propelling the vehicle.

It is well known in the space domain that permanent constraints on designing satellites include minimizing the mass, power consumption and overall size of the satellite or satellites, the overall cost of a satellite and its feasibility being a direct function of those three factors. The mass factor is the dominant factor in relation to the impact on the launch vehicle, all the more so in the context of a constellation with n satellites.

To conform to these various constraints, formation flying concepts utilize n identical satellites propelled by thrusters of diverse technologies, while other concepts call on a mixture of nanosatellites and microsatellites to accomplish reduced or simplified missions. However, in all known cases, each satellite is autonomous and must include all of the standard subsystems. On the other hand, a major drawback of using nanosatellites or microsatellites is that they reduce the extent and final benefit of the mission. It must also be emphasized that many projects, such as those that gave rise to the development of formation flying, cannot make do with the reduced and minimalistic satellite concept that nanosatellites constitute.

The present invention therefore aims to adopt a global approach to the formation flying concept that minimizes the associated masses, volumes, powers and costs.

To this end, this fundamentally innovative approach considers the formation in flight as a whole and not as a combination of n identical satellites, whether the latter are nanosatellites or microsatellites.

Against this background, in order to optimize the final system, the invention proposes in particular to simplify and to specialize as much as possible the role of each element of the satellite. In particular, in accordance with the invention, the role of a satellite of this kind can be split into two totally different functions: a remote function, for example concentration of received and/or sent beams, and a beam processing function. Hereinafter, the concentration function is handled by an entity called a "free object", referring to an object free floating in space and in the vicinity of the body of the satellite. The second (processing) function is handled by the body of the satellite, i.e. the central portion, referred to hereinafter as the "main body" (which has a similar meaning to the term "hub"), this terminology referring to the combination in that body of all the functions of the satellite, in particular its "intelligent" functions, apart from the function of the free object, i.e. concentrating toward the main body beams received from the Earth or some other source and/or concentrating beams emitted by the main body onto the free object, with the Earth or some other destination.

Thus the invention consists in considering the free objects as independent concentrators floating in space with no function other than relaying beams toward the body of the satellite and/or sending beams coming from the satellite toward a predetermined destination. In so doing, the invention minimizes the free object concept, as a result of which the mass, volume and power parameters can be minimized without reducing the range of the chosen mission.

SUMMARY OF THE INVENTION

To this end, the invention consists in a satellite comprising a main body and further comprising, in orbit:

at least one free object floating in space including a portion of the payload transferred from the main body, the free object being restricted to a precise position and attitude relative to the main body, means for generating an electromagnetic force and an electromagnetic torque for controlling the position and the attitude of the free object in accordance with a master-slave relationship.

The invention therefore exploits the elimination of actuators based on thrusters on the free objects, regardless of their type, by replacing them with magnetic actuators. The body of the satellite itself creates a magnetic field on which the free object or objects with their electromagnetic coils "rest".

It will be noted that, thanks to the invention, it is no longer indispensable to use inertia wheels or reaction wheels for attitude orientation of the free objects, and from now on it is possible to rely entirely on the interactions of the magnetic fields of the body with the free object or objects.

According to one embodiment of the invention, the payload portion of the free object is reduced to means for reflecting rays in the visible, ultraviolet or infrared, spectrum, of the mirror type, and/or in the invisible spectrum, of the electromagnetic beam transmission antenna type.

According to one embodiment of the invention, the main body includes means providing "intelligent" functions of the type belonging to the group {central computer, backing store and computation power, communication with the Earth, payload other than that portion of the payload on board the free object and associated data processing, data storage, synchronization, FDIR}.

Thus the invention consists in transferring all the associated functions into the satellite body to obtain the maximum benefit of the pooled intelligence.

In one embodiment of the invention:
the free object includes means for locating the free object, at least one first electromagnetic actuator including at least one first electromagnetic coil adapted to generate an electromagnetic force and an electromagnetic torque, at least one magnetometer for measuring local magnetic field information, and means for telecommunication of the local magnetic field information,
the main body includes a central computer for determining the current to be injected into the coil to correct the electromagnetic force and the electromagnetic torque as a function of the required position and of the attitude of the free object.

In one embodiment of the invention the main body itself includes at least one coarse inertial actuator, for example based on thrusters, and at least one electromagnetic actuator including at least one second electromagnetic coil for generating its own electromagnetic force and electromagnetic torque.

In one embodiment of the invention the free object location means include means for receiving information from a star tracker to determine the inertial position of said free object and RF relative positioning means of the GPS type (here, of course, the GPS function is not used as such; it is only the standard GPS transceiver that is used).

According to one embodiment of the invention, the RF link of the coarse relative positioning means is used as an internal data transmission bus between the main body and said at least one free object.

According to one embodiment of the invention, a pseudo-satellite also known as a "beggar-satellite" is used in free space to absorb onboard increments/decrements of momentum in the {main body—free objects} satellite system.

According to one embodiment of the invention, each element of the {main body—free objects—beggar-satellite} system is charged with an identical quantity of electrical charge to produce a short-range repulsive force adapted to fade and to a negligible level when the elements are at a predetermined distance from each other and not to interfere with the electromagnetic control forces, the charging arrangement generating a short-range passive anticollision system based on electrostatic repulsion.

According to one embodiment of the invention the satellite comprises a plurality of free objects and wherein the position of the free objects is controlled by creating a pulsed magnetic field and alternately turning the respective electromagnetic actuators of each free object on and off sufficiently rapidly for the respective inertias of the free objects to render pointing insensitive to such control.

According to one embodiment of the invention the satellite includes a plurality of free objects which, at launch, are stacked with fixing and stacking mechanisms of the electromagnetic locking type.

Other features and advantages of the invention will become apparent on reading the following detailed description and examining the appended drawings.

BRIEF DESCRIPTION OF THE DRAWINGS

FIG. 1 is a diagram of a main body accompanied by two free objects in a first embodiment of the invention.

FIG. 2 is a diagram of functional units of the main body and the free object in a second embodiment of the invention.

DETAILED DESCRIPTION OF THE PREFERRED EMBODIMENTS

Hereinafter, elements having identical or similar functions carry the same reference numbers.

FIG. 1 represents a satellite 1 consisting of a main body 2 accompanied by two free objects 3 and 3'.

The following description also refers to FIG. 2, which is a diagram of functional units of the main body 2 and the free object 3.

The free object 3 includes a payload 4 that might be reduced to a plane mirror (but which could have any shape) mounted on a very simple parallelepiped structure (not shown) covered with solar cells (not shown) on all its other faces.

The interior of the parallelepiped structure is reduced to the strict minimum, namely and in particular an electronic control unit 14 of fine magnetic actuators 6, magnetometers 7 and a star tracker 8.

The actuators 6 situated inside this structure consist of electromagnetic coils 6 of the air-cored, ferromagnetic core or superconductor type, according to the fields in question. The number of actuators 6 varies and depends on the number of free objects 3 in the constellation, but must at least enable the generation of forces and torques in the three directions. A first embodiment envisages installing coils 6 in the form of trihedra placed at the eight corners of the parallelepiped. This arrangement integrates these coils into the structure, providing eight coils 6 with three axes. In a variant, other coils may be added inside the structure, if necessary. In another variant, to simplify the control law, a single coil is used for each axis.

The direction of the current flowing in each coil controls the direction of the forces and torques generated, in the manner that is known in the art. The magnetometers 7 are placed near the coils 6 to measure the field present and to calculate the currents to be injected into the coils to optimize the induced torques and forces as a function of the required attitude of the free object 3. The number of magnetometers is equal to the number of trihedra but could be different and minimized.

The dimensions of the actuators 6 depend essentially on the intersatellite distance and the forces and torques to be generated to control the {main body—free object} system. The dimensions given herein by way of example relate to an L2 orbit. The disturbing forces and torques in this type of orbit are, in order of decreasing magnitude:
solar pressure,
infrared emission,
solar wind,
RF pressure,
(spurious) magnetic torque.

The magnitudes of these forces depend essentially on the area concerned. The area depends on the installation of a sunshade 12 for protecting the optical means and the sender/receiver means.

However, in the FIG. 1 embodiment, the invention easily limits the size of the sunshade or even totally eliminates the need for any sunshade apart from that provided by the shape of the structure itself and the position and the size of the mirror. This is because, the mirror being a plane mirror, the sunshade is no longer of any utility. The invention therefore minimizes, de facto, the disturbing forces and the disturbing torques that act on the free objects, and therefore provides a de facto improvement in pointing accuracy and control.

For "standard" satellites with an astronomical mission designed for this type of orbit, forces and torques of the order of 200 microN and 200 microNm are estimated for areas of the order of 100 m². It is seen here that the areas could be reduced to a few square meters, proportionately reducing the induced differential disturbing torques and forces.

Nevertheless, in terms of dimensions and margins, forces to be generated of the order of 100 microN are considered here. The lever arms considered here are of the order of one meter.

The distances considered are of the order of 250 m maximum.

The electromagnetic forces concerned are deduced from the following equation:

$$F = \tfrac{3}{2}\pi \cdot \mu_0 \cdot (X \cdot n \cdot I \cdot a^2)_1 \cdot (X \cdot n \cdot I \cdot a^2)_2 / D^4$$

$\mu_0$: permeability of vacuum
X: permeability of magnetic core
n: number of turns per meter
I: coil current
a: coil radius
D: distance between two satellites
½: coil number ½

Note that the permeability of the magnetic core is non-linear and saturated.

The definition of the torque is derived in a manner known in the art by a multiplier factor that corresponds to the distance between the body and the free object.

Note that the concept of the invention, implying a main body with one or more free objects interacting with the main body, applies in a configuration in which the {main body—free objects} constellation is fixed or rotating slowly. The associated centrifugal force is of the order of one millinewton at 250 m for free objects with a mass of 500 kg and a rotation speed of one turn per day.

It is also to be noted that the magnetic field can be created by the main body either by means of an equivalent coil 10 or by means of a permanent magnet 10'. The particular advantage of coil(s) lies in their flexibility of control and direction of the generated fields. The control law for the generated field may be selected either to create a fixed field or to create a pulsed field and to turn the coils of each free object on and off alternately and sufficiently rapidly for the inertia of the free objects 3, 3' to render pointing insensitive to the control law.

The use of superconductor materials obviously extends the scope of the invention, using superconductor materials commercially available at present being realistic in the sense that the temperatures of the focal planes of the instruments in use are of the order of 40 K, which is must less than the temperatures required to achieve superconduction in materials known at present.

The generation of power by the power conditioning unit 11 integrated into the single electronic unit 14 is the result of the isotropic coverage of the solar cells (this also applies to the mirror face, but less so). The dimensions are such that the power balance is always sufficient, regardless of the attitude of the free object. This simplifies this system to the maximum and minimizes induced stresses without imposing any constraint on the attitude of the free object, even in the event of a malfunction. As a function of the type of orbit concerned (L2, etc.) and the duration of the mission, an energy storage unit 13 (typically based on batteries or supercapacitors) is integrated into the single electronic unit. It will be noted that, given the low power consumption of the reduced free object, the units 11 and 13 for conditioning, storing and distributing energy can be integrated into the single unit 14.

Certain mission profiles, in particular in L2 orbit, circumvent this. The global power budget considered is minimal: of the order of 100 W, enabling power to be supplied under all circumstances to the star tracker (<10 W), the electromagnetic coils (<40 W), the control electronics and the magnetometers (<20 W), and the radio-frequency unit for communication with the main body (<10 W). The above dimensions in an L2 orbit represent less than one square meter of solar cells. This area is obviously easily accessible.

The redundancy depends on the number of elements in the {main body—free objects} constellation and the overall philosophy adopted in relation to the management of failure modes thereof. Over a large number of free objects, and given the extreme simplicity and low cost of the free objects, a non-redundant free object would appear to be a good system approach. In special cases, where there are few free objects, a redundancy philosophy may be implemented, as follows:
  hot redundancy of the electronics,
  redundancy of all the cards and the star tracker,
  doubling of all the coils on each ferromagnetic core.

It is seen here that, with or without redundancy in respect of the free objects, the invention proposes a concept that is simple and very reliable compared to concepts based on thrusters and wheels.

Thermal control of the free object will essentially be passive; if the radiation balance indicated a problem in the event of a malfunction, a survival heater (not shown) controlled by a thermostat could be fitted. It is merely a matter of tripping on a low threshold, with no requirement for accuracy.

A location device 15 essentially uses information coming from the following two devices: the star tracker, for determining the inertial position of the free object and to derive the rotation speeds about these three axes, and a radio-frequency positioning device 151 which comprises omnidirectional S-band transceivers 152 (for example Alcatel Topstar 3000 (Registered Trade Mark) GPS transceivers). The number of transceivers 152 may be variable, but a typical omnidirectional accommodation leads to arranging three antennas in an equilateral triangle on each of the two large faces of said parallelepiped. The command and control electronics are included on a dedicated card in the single electronic unit.

Another advantage of this is that in a low Earth orbit (LEO) situation, the use of the GPS may be envisaged for each free object with no additional cost.

The other fine metrology systems (fine and coarse lateral sensors, fine and coarse longitudinal sensors) are made up of passive reflectors 16 (of the cat's eye or cube corner type represented in FIG. 2) situated at the corners of the free object (one per face, located at one end). Accordingly, following coarse location by the location device 15, a transceiver 17 comprising a laser emitter 171 and a receiver 172 could finely locate the free object by emitting a laser beam onto the cube corner 16.

The electronic unit 14 must therefore include the following functions:
  means 11 for conditioning, protecting and distributing the power supplied by the solar cells, including power for the star tracker (100 W of power in the present example), electronic command and control means 140 for the RF positioning device 151, electronic command and control means 141 for the electromagnetic actuators 6, electronic command and control means 142 for the magnetometers 7, and electronic adaptation means, radio-frequency bus head, as described in detail hereinafter.

One feature of the invention is using the radio-frequency link of the free object relative positioning device as an internal bus for transmission of data of the system of the {main body—free objects} constellation. To this end, an RF metrology device 20 is connected to the location device 15 and communicates with a central RF metrology and RF communication device 21 in the main body. This device 21 sends/receives data on the internal transmission bus via a send/receive antenna 211. The central RF metrology and RF communication device 21 is connected to an input/output of a central computer 18. Accordingly, the computer 18, which is located in the main body, will "see" virtually all of its users connected to an "internal" data bus (for example a Mil-STD-1553 serial data bus that is standardized in the satellite field, although this is not limiting on the invention), in logical fashion, and without having to know the geographical location of its users (on the main body or on the free object number n).

The bandwidth allowed by this radio-frequency link will be predetermined to allow the use of this kind of relation.

For its part, the main body 2 integrates all the other means for implementing the various functions of the constellation, and in particular those already known to the person skilled in the art, namely:

a global instrument 19: optical and electronic processing of data received by the payload, which is a mirror in the present example, although this is merely one non-limiting example of a payload, which may consist in a mirror transmitting rays in the visible or invisible spectrum, the latter case expanding the function of the onboard payload to that of a telecommunication antenna, the onboard central computer 18, a central fine optical metrology device 22 sending information to and receiving information from the cube corner 16 and sending it to the computer 18 for fine adjustment of the position of the body 2 and the free object 3, the central RF coarse metrology and RF communication device 21, a backing store 181, coarse and inertial actuators 23 comprising thrusters, etc. and corresponding tanks, fringe detectors (not shown), as well as the following equipments, also known in the art:
star trackers 24, gyroscope (not shown), sun tracker (not shown), RF TM/TC communication module 26 connected firstly to the central computer 18 and secondly to an antenna 25 for communication with the Earth, a power generator 27 coupled to batteries 28, conventional AOCS measurement sensors 29, etc.

All of the above equipment is known in the art and is not described in detail here because it is familiar to the person skilled in the art; for more details see "Satellite Communications Systems", Fourth Edition, by Gerard Maral and Michel Bousquet, published by John Wiley & Sons Ltd., for example.

The global magnetic field B for the constellation is generated in the main body 2, either by conventional electromagnetic coils or superconductor coils, or in some cases by permanent magnets, as stated above.

The launch configuration will be that of the main body 2 on which the free objects 3, 3' are stacked using "soft" fixing and stacking mechanisms (typically electromagnetic locks).

Using its inertial actuators, the main body 2 will handle all of the cruise phase, up to final positioning in the mission orbit. Once all the orbit corrections have been effected, then separation occurs. The free objects will separate one after the other, with very low initial speeds controlled from the outset by the electromagnetic actuators, with the benefit of operating over extremely small distances and therefore with very high available forces.

Once the constellation has been established in its standard and required geometrical configuration, inertial orientation will be effected by the main body and intersatellite relative attitude and directions can be effected by the electromagnetic actuators. The thrusters of the main body will be used to correct inertial errors and induced rotations.

If the accuracy of the thrusters should not prove sufficient to correct inertial errors and induced rotations, an advantageous variant of the invention would use an additional pseudo-satellite 30, called the "beggar-satellite" or "beggar", the purpose of which would be to absorb inertial deltas generated by the payload bodies of the {main body—free objects} system. Relying on the principle of conservation of momentum, the beggar-satellite would absorb increments/decrements of onboard kinetic moments of the {main body—free objects} constellation. This remote beggar-satellite could be extremely simple, having no required accuracy, attitude or position, but obviously required not to collide with the other elements of the constellation.

On the topic of anticollision, note that an advantageous passive anticollision option complements the use of electromagnetic active control forces. This passive option consists in charging each element of the {main body—free objects—beggar} constellation with the same quantity of electrical charge. The effect of this is to produce a short-range repulsive force that will fade to a negligible level when the elements are around ten meters away from each other and will not interfere with the standard electromagnetic control forces.

This will simplify anticollision analysis in the failure detection isolation recovery (FDIR) mode. It will suffice to power down the coils of the free objects to cancel any induced force and leave only the electrostatic forces operating. The charges will depend entirely on the tolerable initial intersatellite speeds.

To summarize, the invention optimizes the concept of formation flying by considering the satellite as a whole and by specializing each of its parts to exercising its prime function. In particular, the free objects are reduced to the function of returning/transmitting rays (whether in the visible or invisible spectrum), and become flying mirrors, moved by electromagnetic propulsion means whose magnetic field is created by the main body (central satellite). The main body concentrates all the other functions and creates the magnetic field for the whole constellation of free objects. The main body acts globally and inertially on the constellation via inertial actuators installed only on the main body. The RF subsystem for communication between the free objects and the main body is used as a virtual internal data bus of the constellation. An advantageous option of the invention is to install a new element of the constellation called a beggar-satellite for "absorbing" variations in the global momentum of the {main body—free objects—beggar} constellation system, thereby reducing the role of the inertial actuators installed in the main body. A global electrostatic charge may be generated on each element so that a short-range repulsive force is generated and prevents collision. This force disappears completely at a distance of a few tens of meters.

It will be noted that the present application has a very wide field of application, apart from the application mentioned above:
- formation flying in L2 orbits for astronomical missions,
- formation flying in GEO or LEO orbits for astronomical and remote sensing missions,
- generic formation flying, regardless of the mission,
- degenerated formation flying for very precise servocontrol.

One option of the invention is to use the concept of degenerated formation flying based on electromagnetic actuators in conjunction with a beggar-satellite. For example, this concept may be applied to an astrometric satellite in L2 orbit for measuring angular errors of the order of one microarcsecond and requiring actuators having an accuracy better than one micronewton.

In this application, the beggar-satellite is a very simple element including the magnetic field generation coils and a very coarse location device providing location accurate to one meter. The electrostatic passive anticollision system can be implemented. The astrometric satellite then carries coils in three redundant directions duplicated to produce all the necessary torques and is controlled using the field B created by the beggar-satellite at a distance of a few tens of meters. The operative forces are more than sufficient (>10 mN) and extremely precise (<1 microN), with extremely low noise (coil current control). Inertial pointing is provided by a conventional astrometric satellite pointing system, the beggar-satellite absorbing drift caused by the isolated system.

The invention claimed is:

1. A satellite comprising a main body and further comprising, in orbit:
   - at least one free object floating in space including a portion of a payload transferred from the main body, the free object being restricted to a predetermined position and attitude relative to the main body,
   - means for generating an electromagnetic force and an electromagnetic torque for controlling the position and the attitude of the free object in accordance with a master-slave relationship.

2. A satellite as claimed in claim 1 wherein said payload portion of the free object is at least one of a mirror type means for reflecting rays in the visible, ultraviolet or infrared, spectrum, and electromagnetic beam transmission antenna for reflecting rays in other regions of the electromagnetic spectrum.

3. A satellite as claimed in claim 1, wherein said main body includes means for providing a function selected from the group consisting of central computer, backing store and computation power, communication with the Earth, payload other than that portion of said payload on board the free object and associated data processing, data storage, synchronization, FDIR.

4. A satellite as claimed in claim 1 comprising a plurality of free objects and wherein the position of said free objects is controlled by creating a pulsed magnetic field and alternately turning the respective electromagnetic actuators of each free object on and off sufficiently rapidly for the respective inertias of said free objects to render pointing insensitive to such control.

5. A satellite as claimed in claim 1 including a plurality of free objects which, at launch, are stacked with fixing and stacking mechanisms of the electromagnetic locking type.

6. A satellite as claimed in claim 1 wherein:
   said free object includes means for locating said free object, at least one first electromagnetic actuator including at least one first electromagnetic coil adapted to generate an electromagnetic force and an electromagnetic torque, at least one magnetometer for measuring local magnetic field information, and means for telecommunication of said local magnetic field information,
   said main body includes a central computer for determining the current to be injected into said coil to correct said electromagnetic force and said electromagnetic torque as a function of the required position and of the attitude of the free object.

7. A satellite as claimed in claim 6 wherein said main body itself includes at least one coarse inertial actuator, and at least one electromagnetic actuator including at least one second electromagnetic coil for generating its own electromagnetic force and electromagnetic torque.

8. A satellite as claimed in claim 6 wherein said free object location means include means for receiving information from a star tracker to determine the inertial position of said free object and radio frequency relative positioning means of the GPS type.

9. A satellite as claimed in claim 6 wherein a radio frequency link of said relative positioning means is used as an internal data transmission bus between said main body and said at least one free object.

10. A satellite as claimed in claim 1 wherein a pseudo-satellite is used in free space to absorb onboard increments/decrements of momentum in the main body—free objects satellite system.

11. A satellite as claimed in claim 10 wherein each element of the main body—free objects—pseudo-satellite system is charged with an identical quantity of electrical charge to produce a short-range repulsive force adapted to fade to a negligible level when said elements are at a predetermined distance from each other and not to interfere with the electromagnetic control forces, said charging arrangement generating a short-range passive anticollision system based on electrostatic repulsion.

* * * * *